(12) United States Patent
Nomura

(10) Patent No.: US 6,971,269 B2
(45) Date of Patent: Dec. 6, 2005

(54) PRESSURE SENSOR DEVICE WITH TEMPERATURE DETECTING ELEMENT AND ATTACHMENT METHOD THEREOF

(75) Inventor: Takashi Nomura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/105,492

(22) Filed: Apr. 14, 2005

(65) Prior Publication Data

US 2005/0229708 A1 Oct. 20, 2005

(30) Foreign Application Priority Data

Apr. 15, 2004 (JP) .............................. 2004-120340

(51) Int. Cl.⁷ ............................................. G01L 19/04
(52) U.S. Cl. ......................................... 73/708; 73/700
(58) Field of Search ........................................... 73/708

(56) References Cited

U.S. PATENT DOCUMENTS

| 5,945,606 A | 8/1999 | Tokunaga et al. |
| 2004/0134282 A1 | 7/2004 | Hayashi et al. |

Primary Examiner—William Oen
Assistant Examiner—Alandra Ellington
(74) Attorney, Agent, or Firm—Posz Law Group, PLC

(57) ABSTRACT

In a sensor device having a pressure detecting element and a temperature detecting element, a port portion has an opening portion from which a pressure medium is introduced to a pressure introduction passage of the port portion, and a lead wire connected to the temperature detecting element is disposed in the port portion to be fixed by a fixing portion at a tip end portion of the port portion. Furthermore, the temperature detecting element is disposed such that the pressure medium introduced from the opening portion passes the temperature detecting element and is conducted to the pressure detecting element through the pressure introduction passage. Because the temperature detecting element is disposed in the pressure introduction passage, a diameter of the port portion can be made small.

20 Claims, 5 Drawing Sheets

PRESSURE SENSOR DEVICE WITH TEMPERATURE DETECTING ELEMENT AND ATTACHMENT METHOD THEREOF

CROSS REFERENCE TO RELATED APPLICATION

This application is based on Japanese Patent Application No. 2004-120340 filed on Apr. 15, 2004, the contents of which are incorporated herein by reference in there entirety.

FIELD OF THE INVENTION

The present invention relates to a pressure sensor device including a pressure detecting element and a temperature detecting element, and an attachment method thereof.

BACKGROUND OF THE INVENTION

FIG. 6A shows a sensor device 900 attached to a wall member 940 of a subject device in which a subject to be detected is contained, and FIG. 6B is a top view of the sensor device 900 in FIG. 6A. The sensor device 900 includes a case 910, flange portions 920 and a port portion 930. Flange portions 920 are provided at two opposite sides of the case 910, and through holes 921 penetrating through the flange portions 920 are formed in the flange portions 920.

The case 910 has therein a pressure detecting chamber, and pressure introduced from a tip end of the port portion 930 is detected by a pressure detecting element provided in the pressure detecting chamber. Further, a temperature detecting element for detecting the temperature of the interior of the wall member 940 is disposed in the port portion 930.

When the sensor device 900 is attached to the wall member 940, the port portion 930 is inserted into an attachment hole of the wall member 940, and the flange portions 920 are fixed to an outer wall surface of the wall member 940 using screws 922. Therefore, attaching of the sensor device 900 to the wall member 940 is complicated.

If the sensor device 900 is simply attached to the wall member 940 through an elastic member without using the screws 922, the sensor device 900 may be easily removed from the detachment hole of the wall member 940 due to the pressure of the interior of the wall member 940. Furthermore, when the area of the attachment hole is made large, the force received from the interior of the wall member of the subject device to the tip end of the port portion 930 becomes larger, and the sensor device 900 is more easily removed.

SUMMARY OF THE INVENTION

In view of the above-described problems, it is an object of the present invention to provide a sensor device having a pressure detecting element and a temperature detecting element, which can be easily attached to a wall member of a subject device while preventing the sensor device from being removed from the wall member of the subject device.

It is another object of the present invention to provide a method of attaching a sensor device to a wall member of a subject device.

According to an aspect of the present invention, a sensor device includes a pressure detecting element for detecting a pressure, a terminal that is electrically connected to the pressure detecting element, a case in which the pressure detecting element is received and the terminal is insert-molded, a port portion connected to the case and having therein a pressure introduction passage through which a pressure medium is introduced to the pressure detecting element, a temperature detecting element disposed in the pressure introduction passage to detect a temperature of the pressure medium, and a lead wire through which the temperature detecting element is electrically connected to the terminal.

In the sensor device, a fixing member is disposed at a tip end portion of the port portion to fix the lead wire at the tip end portion of the port portion. Therefore, it can restrict the temperature detecting element from vibrating. Further, the port portion has an opening portion from which the pressure medium is introduced to the pressure introduction passage, and the opening portion penetrates through a side wall of the port portion at a position proximate to the tip end portion. In addition, the temperature detecting element is disposed such that the pressure medium introduced from the opening portion passes the temperature detecting element and is conducted to the pressure detecting element through the pressure introduction passage. Accordingly, it is possible to set a space for arranging the temperature detecting element within the pressure introduction passage, and a radial dimension of the port portion can be made small. As a result, a force to be applied from an interior of the wall member of the subject device to the port portion can be made smaller.

For example, the lead wire is bent to have a U-shaped bend. In this case, a bottom portion of the U-shaped bend of the lead wire is fixed by the fixing member at the tip end portion of the port portion.

The temperature detecting element may be disposed at a position facing the opening portion. In this case, the temperature inside a wall member of a subject device can be more accurately detected using the temperature detecting element.

The sensor device can include an attachment elastic member through which the port portion is attached to an attachment hole of a wall member of a subject device. As an example, the attachment elastic member includes a first end flange portion having a protrusion protruding radially inside in a recess portion of the port portion to contact an inner wall surface of the wall member of the subject device, a second end flange portion arranged between a side surface of the port portion and an outer wall surface of the wall member of the subject device, and a wall portion extending between the first end flange portion and the second end flange portion in the axial direction. In this case, the wall portion of the attachment elastic member is inserted between an outer peripheral surface of the port portion and a wall surface of the wall member of the subject device having the attachment hole. Accordingly, the sensor device can be easily attached to the wall member of the subject device through the attachment elastic member while it can prevent the sensor device from being removed from the subject device.

According to another aspect of the present invention, a port portion of a sensor device has an opening portion opened at a tip end of the port portion, from which a pressure medium is introduced to a pressure introduction passage of the port portion, and a part of the lead wire is insert-molded in a wall portion of the port portion. In this case, the lead wire can be fixed without using an additional fixing member. Even in this case, a temperature detecting element is disposed such that the pressure medium introduced from the opening portion passes the temperature detecting element and is conducted to a pressure detecting element through the pressure introduction passage. Accordingly, a radial dimension of the port portion inserted to an attachment hole of a wall member of a subject device can be made smaller, and a force applied to the port portion of the sensor device from the interior of the subject device can be relatively reduced.

In this case, the temperature detecting element is disposed in the pressure introduction passage adjacent to the tip end of the port portion, for example.

According to another aspect of the present invention, a method for attaching a sensor device to a wall member of a subject device includes: preparing an attachment elastic member that is formed to have a hollow shape and includes a first end flange portion having an end protrusion protruding inside in a radial direction at one end of the attachment elastic member in an axial direction, a second flange portion provided at the other end of the attachment elastic member in the axial direction, and an inner protrusion portion provided between the first end flange portion and the second end flange portion in the axial direction to protrude radially inside; and temporarily attaching the attachment elastic member to the sensor device. The temporarily attaching includes inserting a tip portion of the port portion from the second end flange portion of the attachment elastic member into the attachment elastic member such that a tip end surface of the port portion contacts the end protrusion and the inner protrusion portion is received in a recess portion of the port portion. Furthermore, the attachment method includes moving the tip end portion of the port portion to an upper side of an attachment hole of the wall member of the subject device in a state where the attachment elastic member is temporarily attached to the port portion, and pushing the sensor device toward the attachment hole of the wall member of the subject device so that the port portion is inserted into the attachment hole until the end protrusion of the first flange portion is received in the recess portion of the port portion. Therefore, the port portion is fixed to the attachment hole through the attachment elastic member after the pushing.

For example, the preparing of the attachment elastic member includes forming a tapered surface on an outer wall surface of the first end flange portion. In this case, the sensor device having the elastic member can be smoothly inserted into the attachment hole of the wall member of the subject device.

Preferably, the pushing is performed in one step. Therefore, the attachment of the sensor device to the subject device can be easily performed.

BRIEF DESCRIPTION OF THE DRAWINGS

The above and other objects, features and advantages of the present invention will become more apparent from the following detailed description of exemplary embodiments made with reference to the accompanying drawings, in which.

DETAILED DESCRIPTION OF EXEMPLARY EMBODIMENTS

First Exemplary Embodiment

In this embodiment, a sensor device 100 is typically attached to an intake manifold of a vehicle, for example, and may be used as an intake pressure sensor for detecting an intake pressure and an intake temperature in the intake manifold.

Figure 1:
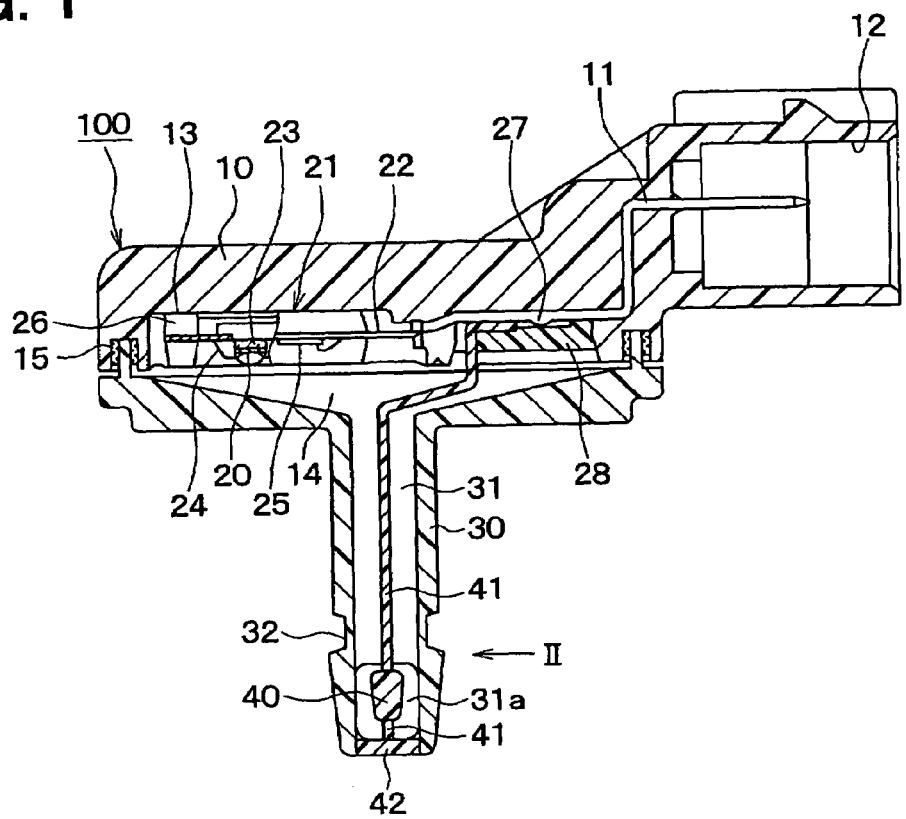
FIG. 1 is a schematic sectional view of a pressure sensor device having a temperature detecting element according to a first exemplary embodiment of the present invention.

As shown in FIG. 1, the sensor device 100 includes a case 10, a pressure detecting element 20, a port portion 30 and a temperature detecting element 40. A terminal 11 connected to an exterior is insert-molded in the case 10. The pressure detecting element 20 is electrically connected to the terminal 11 and is disposed in the case 10 to detect pressure. The port portion 30 is connected to the case 10 and has a pressure introduction passage 31 for introducing a pressure medium to the pressure detecting element 20. The temperature detecting element 40 is electrically connected to the terminal 11, and is provided in the pressure introduction passage 31 to detect a temperature of the pressure medium.

The case 10 is molded using a resin material. For example, the resin material is poly-phenylene sulfide (PPS), poly-buthylene terephthalate (PBT) or an epoxy resin. An IC 21, which includes the pressure detecting element 20, is molded into the case 10. The molded IC 21 is electrically connected to the terminal 11, and a pressure signal detected by the pressure detecting element 20 is output to an exterior process circuit through a lead frame 22.

In this embodiment, plural terminals 11 connected to the exterior are formed integrally with the case 10 by an insert molding in the case 10, for example. The terminals 11 are made of a conductive material, for example, copper. One end portion of each terminal 11 is electrically connected to the lead frame 22. The other end portion of each terminal 11 is exposed at a socket opening portion 12 of the case 10, and is connected to the exterior circuit member. In this embodiment, the socket opening portion 12 of the case 10 and the other end portions of the terminals 11 positioned in the socket opening portion 12 constitute a connector portion of the sensor device 100.

The pressure detecting element 20 is mounted in a recess portion 13 that is provided within the case 10. The pressure detecting element 20 generates an electrical signal having a level corresponding to a detected pressure value. The pressure detecting element 20 may be constructed to employ the piezoresistance effect. For example, the pressure detecting element 20 may be constructed with a diaphragm and a bridge circuit having a diffusion resistance.

The pressure detecting element 20 is bonded to a surface (e.g., a bottom surface in FIG. 1) of a pedestal 23 made of glass, for example. The other surface (e.g., a top surface in FIG. 1) of the pedestal 23 is fixed using an adhesive so as to perform die-bonding of the pressure detecting element 20. The pressure detecting element 20 is arranged such that a pressure receiving surface of the pressure detecting element 20 is positioned at an open side of the recess portion 13. The pressure detecting element 20 and the lead frame 22 are electrically connected to the wire 24 by a wire bonding process. The wire 24 may be made of gold (Au).

A signal process IC 25 for amplifying a signal from the pressure detecting element 20 is provided in the lead frame 22. The molded IC 21 is protected such that the signal process IC 25 and the lead frame 22 are enclosed by a molded resin 26, for example, epoxy resin.

The port portion 30 is connected to the case 10 to cover the open side of the recess portion 13 of the case 10. A pressure detection chamber 14 is formed by the case 10 and the port portion 30 between the case 10 and the port portion 30.

The port portion 30 is made of a resin material having a heat resistance, for example, PBT or PPS. The port portion 30 may be made of a hard epoxy resin having a chemical resistance. In the example of FIG. 1, the port portion 30 is attached to the case 10 by using an adhesive material 15.

The port portion 30 protrudes in a direction opposite to the case 10, and has therein the pressure introduction passage 31 communicating with the pressure detection chamber 14. The pressure introduction passage 31 extends to an opening portion 31a that is opened at a side surface of a tip end portion of the port portion 30. The pressure medium from the opening portion 31a is introduced to the pressure detection chamber 14 through the pressure introduction passage 31 so that the pressure to be detected is applied to the pressure receiving surface of the pressure detecting element 20.

A lead wire 41 extends inside the port portion 30, and is electrically and mechanically connected to the terminals 11 at a connection portion 27 by welding, for example. The temperature detecting element 40 for detecting temperature is connected to the lead wire 41. For example, the temperature detecting element 40 is a general thermistor element. The temperature detecting element 40 may be made of a metal, for example, Co, Mn, Ni.

A fixing member 42 made of resin is provided at a tip end of the port portion 30 so as to restrict vibration of the temperature detecting element 40. The temperature detecting element 40 and the lead wire 41 are fixed by the connection portion 27 and the fixing member 42. Accordingly, even when vibration is applied to the sensor device 100, the fixing member 42 prevents the temperature detecting element 40 and the lead wire 41 from moving.

Figure 2:
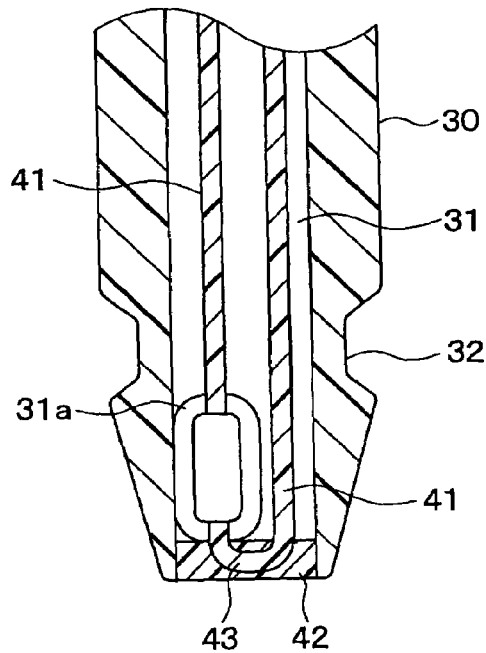
FIG. 2 is a side view taken from the direction II in FIG. 1.

As shown in FIG. 2, the lead wire 41 has a U-shaped bend at the tip portion of the port portion 30. A bottom portion 43 of the U-shaped bend of the lead wire 41 is embedded in the fixing member 42. That is, the bottom portion 43 of the U-shaped bend of the lead wire 41 is enclosed by the fixing member 42.

In the sensor device 100, the surface of the lead wire 41 may be coated with a coating material to protect the lead wire 41 from corrosion and dirt in the operating environment. Alternatively, a tube member for protecting the lead wire 41 may be provided to cover the lead wire 41. Furthermore, the connection portion 27 of the lead wire 41 is also covered by a cover member to be protected from corrosion and dirt.

As shown in FIGS. 1 and 2, the temperature detecting element 40 is arranged at a position facing the opening portion 31a of the port portion 30. The opening portion 31a is used as an inlet through which the pressure medium is introduced. Because the temperature detecting element 40 is provided at a position facing the opening portion 31a of the port portion 30, the temperature of the pressure medium introduced from the opening portion 31a can be accurately detected.

A part of an outer wall surface of the port portion 30 is recessed inwardly in a radial direction of the port portion 30 to form an annular recess portion 32. The recess portion 32 is arranged at a position offset from the opening portion 31a to a side of the case 10 in an axial direction of the port portion 30. For example, the recess portion 32 is arranged such that a center portion of the recess portion 32 is offset to the side of the case 10 from the opening portion 31a in the axial direction of the port portion 30. Alternatively, all area of the recess portion 32 may be offset to the side of the case 10 from the opening portion 31a in the axial direction of the port portion 30 at a position adjacent to the opening portion 31a.

Next, a manufacturing method of the pressure sensor device 100 having the temperature detecting element 40 will be described.

First, the terminals 11 are formed in the case 10 by insert-molding. That is, the case 10 in which the terminals 11 are insert-molded is prepared. Then, the pressure detecting element 20 is arranged and fixed in the recess portion 13 using an adhesive, for example. Further, wire bonding between the pressure detecting element 20 and the lead frame 22 is performed. Thereafter, at least the lead frame 22 is enclosed by the molded resin 26, so as to form the molded IC 21.

Further, the lead wire 41 is electrically connected to the connection portion 27 provided in the terminals 11, and the connection portion 27 is covered and protected by the cover member 28. The lead wire 41 is bent so that the temperature detecting element 40 connected to the lead wire 41 will be inserted in the port portion 30.

Then, the port portion 30 is connected to the case 10. For example, as shown in FIG. 1, the port portion 30 is attached to the case 10 using the adhesive material 15. While the port portion 30 is connected to the case 10, the temperature detecting element 40 is inserted to an inner space of the port portion 30 so as to face the opening portion 31a.

Thereafter, a tip area of the port portion 30 is filled with the fixing member 42 so as to fix the lead wire 41. An injection material for forming the fixing member 42 can be injected to the tip area of the port portion 30 to enclose the bottom portion 43 of the lead wire 41. As an injection material for forming the fixing member 42, a half-hardened gel resin material made of an epoxy resin may be used, for example.

A method of injecting material for forming the fixing member 42 will be now described. After the port portion 30 is attached to the case 10, an injection material is injected from a hole provided at the tip portion of the port portion 30 so as to form the fixing member 42. As shown in FIG. 2, the injection material is injected such that the bottom portion 43 of the U-shaped bend of the lead wire 41, positioned at the tip portion of the port portion 30, is enclosed by the fixing member 42. Accordingly, the lead wire 41 is fixed by the connection portion 27 and the fixing member 42 so that vibration resistance of the temperature detecting element 40 and the lead wire 41 can be improved.

Through the above-described assembling operation, the pressure sensor device 100 with the temperature detecting element 40 is formed.

Figure 3A:
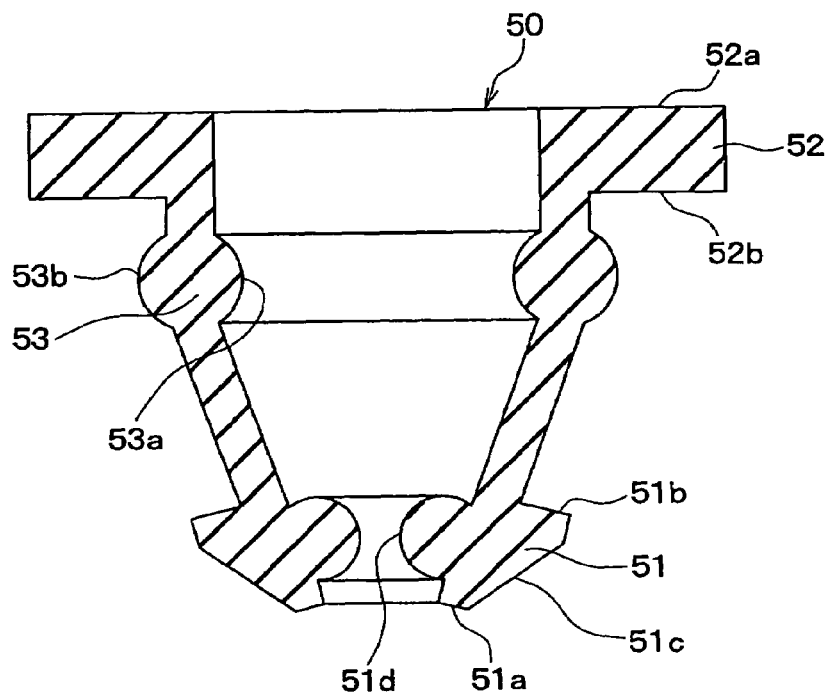
FIG. 3A is a schematic sectional view showing an attachment elastic member.
Figure 3B:
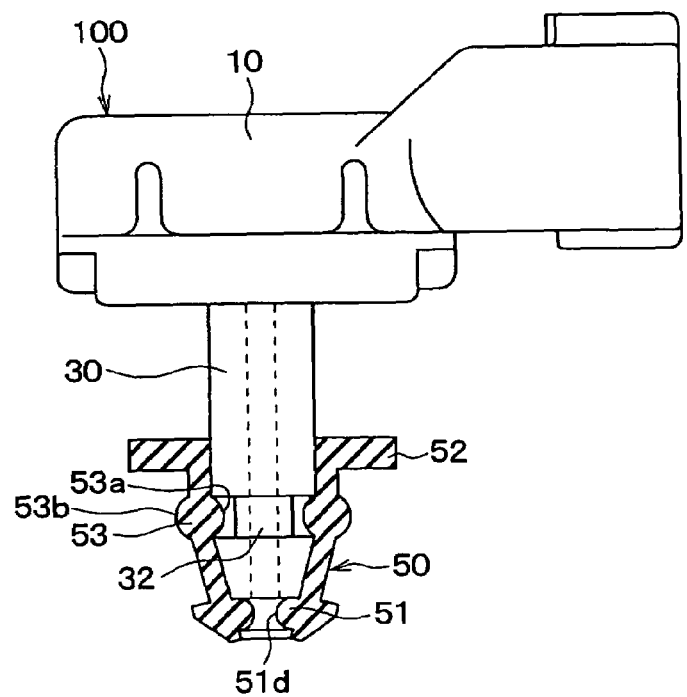
FIG. 3B is a view showing a temporary state in which the attachment elastic member is fitted to the pressure sensor device.

Next, an attachment method for attaching the sensor device 100 to a wall member (support wall) of a subject device will be now described. FIG. 3A is a schematic sectional view showing an attachment elastic member 50, and FIG. 3B shows a temporarily attached state of the attachment elastic member 50 of FIG. 3A to the sensor device 100. In FIG. 3B, the inner structure of the sensor device 100 is omitted.

The structure of the attachment elastic member 50 will be now described. As shown in FIG. 3A, the attachment elastic member 50 is formed to have a hollow shape extending in an axial direction. The attachment elastic member 50 is provided with a first end flange portion 51 at one end (tip end) in the axial direction, and a second end flange portion 52 at the other end in the axial direction.

The first end flange portion 51 has a tip end surface 51a at one end of the first end flange portion 51, and a hook surface 51b at the other end (at an end side opposite to the tip end). An outer periphery of the first end flange portion 51 is chamfered to form a taper surface 51c between the tip end surface 51a and the hook surface 51b. A tip end protrusion portion 51d is provided on an inner wall surface of the first end flange portion 51 of the attachment elastic member 50.

As shown in FIG. 3A, the tip end protrusion portion 51d protrudes inward in a radial direction of the attachment elastic member 50, and has a semi-circular shape in cross-section. The tip end protrusion portion 51d is continuously provided in a one circle on the inner wall surface of the attachment elastic member 50.

The second end flange portion 52 has a rear end surface 52a at its rear end, and a rear end hook surface 52b at an opposite end of the rear end.

As shown in FIGS. 3A and 3B, a radius of the first end flange portion 51 is set smaller than a radius of the second end flange portion 52. Furthermore, an inner radius of the first end flange portion 51 is set smaller than an outer radius of the tip end of the port portion 30. Therefore, when the attachment elastic member 50 is attached to the sensor device 100, the first end flange portion 51 is elastically deformed so as to fasten the tip end of the port portion 30. Accordingly, when the attachment elastic member 50 is temporarily attached to the sensor device 100, it can prevent the attachment elastic member 50 from being detached from the sensor device 100.

A protrusion portion 53 is provided in the attachment elastic member 50 between the first end flange portion 51 and the second end flange portion 52 in the axial direction of the port portion 30. The protrusion portion 53 is constructed with an inner wall protrusion 53a protruding radially inward from an inner wall surface of the attachment elastic member 50 and an outer wall protrusion 53b protruding radially outward from an outer wall surface of the attachment elastic member 50. As shown in FIG. 3A, the protrusion portion 53 has an approximate circular shape in cross section, and is formed continuously in a one circle in a circumferential direction of the inner wall surface and the outer wall surface of the attachment elastic member 50.

As a material of the attachment elastic member 50, acrylonitricle-butadiene rubber (NBR) or hydrogenated NBR (H-NBR) can be used, for example.

Next, a temporary attachment of the attachment elastic member 50 to the sensor device 100 will be described with reference to FIG. 3B. As shown in FIG. 3B, when the tip end of the port portion 30 of the sensor device 100 is inserted into the attachment elastic member 50 from the second end flange portion 52, the tip end protrusion portion 51d of the attachment elastic member 50 contacts the tip end of the port portion 30, and the inner wall protrusion portion 53a of the protrusion portion 53 is received in the recess portion 32 of the port portion 30.

Because the inner diameter of the first end flange portion 51 is made smaller than the outer diameter of the tip end portion of the port portion 30, the diameter of the first end flange portion 51 is enlarged when the attachment elastic member 50 is attached to the port portion 30. Accordingly, the first end flange portion 51 press-contacts the outer wall surface of the port portion 30 by elastic constricting force of the first end flange portion 51 when the attachment elastic member 50 is attached to the port portion 30. Therefore, the attachment elastic member 50 can be temporarily attached to the port portion 30 as shown in FIG. 3B.

Figure 4A:
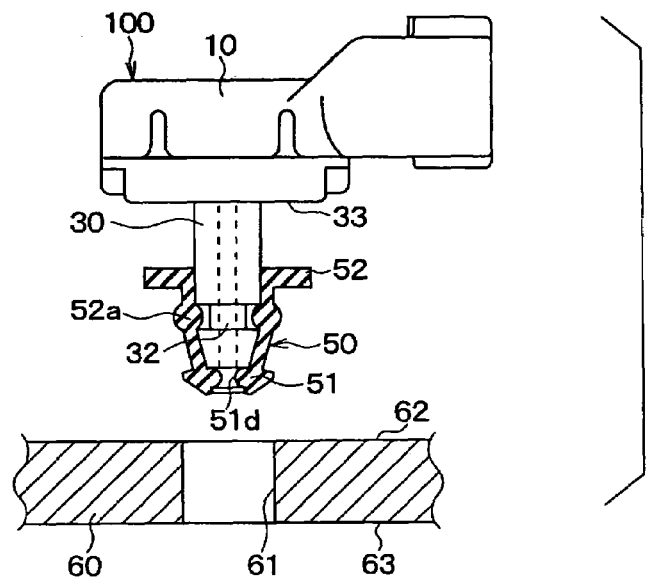
FIG. 4A is a disassembled view showing a subject device and a sensor device having a temporarily fitted attachment elastic member.
Figure 4B:
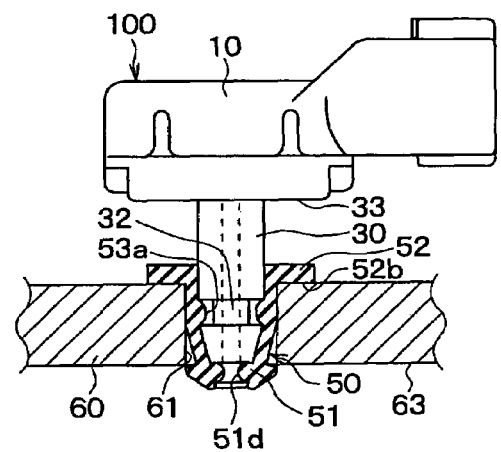
FIG. 4B is a schematic sectional view showing an inserted state of the attachment elastic member into an insertion hole of a wall member of a subject device.
Figure 4C:
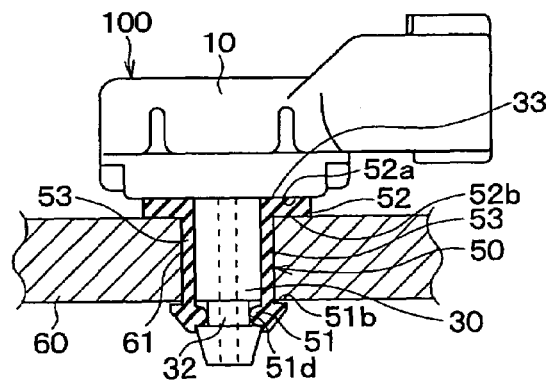
FIG. 4C is a schematic sectional view showing an attached state of the pressure sensor device to the wall member of the subject device.

Next, a method of attaching the pressure sensor device 100 to a wall member of a subject device will be now described with reference to FIGS. 4A, 4B and 4C. FIG. 4A is a disassembled view showing a temporarily assembled state of the attachment elastic member 50 to the port portion 30, and a wall member 60 of a subject device. FIG. 4B shows a state where the attachment elastic member 50 is inserted to an attachment hole 61 of the wall member 60 from one direction. FIG. 4C shows an attached state of the sensor device 100 to the wall member 60 in the one direction.

First, as shown in FIG. 4A, the sensor device 100 having the temporarily assembled elastic member 50 in a state shown in FIG. 3B is moved to a position above the attachment hole 61 of the wall member 60.

Then, as shown in FIG. 4B, the attachment elastic member 50 is inserted into the attachment hole 61 of the wall member 60 in an insertion direction. Specifically, the port portion 30 of the sensor device 100 is inserted into the attachment hole 61 of the wall member 60 together with the attachment elastic member 50, so that the attachment elastic member 50 temporarily attached to the sensor device 100 is inserted to the attachment hole 61.

At this time, because the rear end hook surface 52b of the second end flange portion 52 of the elastic member 50 press-contacts an outer wall surface 62 of the wall member 60. At this state which is shown in FIG. 4B, the port portion 30 outside the attachment elastic member 50 is not inserted to the attachment hole 61. Furthermore, because the outer wall surface of the first end flange portion 51 of the attachment elastic member 50 has the taper surface 51, the attachment elastic member 50 is smoothly inserted to the attachment hole 61.

Furthermore, in the state of FIG. 4B, the outer wall protrusion 53b of the protrusion portion 53 press-contacts the inner wall surface of the attachment hole 61 and is deformed to be approximately flat. Therefore, a clearance between the inner wall surface of the attachment hole 61 and the port portion 30 is tightly sealed by the elastic force of the attachment elastic member 50.

Thereafter, when the sensor device 100 is pushed in the same direction as the insertion direction toward the wall member 60 from the state of FIG. 4B, the rear end surface 52a of the second end flange portion 52 press-contacts the side surface 33 of the port portion 30, and the rear end hook surface 52 press-contacts the outer wall surface 62 of the wall member 60. Therefore, the second end flange portion 52 is tightly inserted between the side surface 33 and the outer wall surface 62 of the wall member 60. Accordingly, as shown in FIG. 4C, the sensor device 100 is tightly attached to the attachment hole 61 of the wall member 60 through the attachment elastic member 50.

When the sensor device 100 is pushed from the state of FIG. 4B to the state of FIG. 4C, the inner wall protrusion 53a of the protrusion portion 53 is press-inserted between the inner wall surface of the attachment hole 61 and the outer wall surface of the port portion 30, and is deformed to be approximately flat. Further, when the inner wall protrusion 53a and the outer wall protrusion 53b become flat, the inner wall protrusion 53a press-contacts the outer wall surface of the port portion 30 of the sensor device 100, and the outer wall protrusion 53b press-contacts the inner wall surface of the attachment hole 61 by the elastic force of the attachment elastic member 50. Accordingly, the port portion 30 of the sensor device 100 is strongly fixed to the wall member 60 through the attachment elastic member 50.

Furthermore, when the sensor device 100 is pushed from the state of FIG. 4B to the state of FIG. 4C, the tip end protrusion portion 51d of the attachment elastic member 50 is positioned to the recess portion 32 of the port portion 30 by the movement of the sensor device 100 toward the wall member 60. Therefore, the tip end protrusion portion 51d of the first end flange portion 51 of the attachment elastic member 50 is received in the recess portion 32 of the port portion 30, and the tip end hook surface 51b press-contacts the inner wall surface 63 of the wall member 60.

The attachment elastic member 50 is fixed so that the wall member 60 is pinched between the tip end hook surface 51b of the first end flange portion 51 and the rear end hook surface 52b of the second end flange portion 52. Furthermore, the first end flange portion 51 and the second end flange portion 52 are pinched between the side surface 33 of the port portion 30 and the tip end portion of the port portion 30. Therefore, it can prevent the attachment elastic member 50 from being moved from the attachment hole 61 of the wall member 60 after the sensor device 100 is attached to the attachment hole 61. As a result, the sensor device 100 can be easily tightly attached to the wall member 60 of a subject device through the elastic member 50.

In this embodiment, a total dimension of a thickness of a wall portion of the attachment hole 61 of the wall member 60 in the axial direction of the port portion 30 and a thickness of the second end flange portion 52 is set to correspond to a length between the side surface 33 and the recess portion 32 of the port portion 30 in the axial direction.

Accordingly, by pushing the sensor device 100 having the temporarily attached elastic member 50 to the attachment hole 61 of the wall member 60 in one direction, the sensor device 100 can be tightly attached to the wall member 60 of the subject device by one step.

If the subject device is an intake manifold of a vehicle, the sensor device 100 detects a temperature and a pressure inside the intake manifold of the vehicle.

When a pressure is applied from an interior of the wall member 60 of the subject device (e.g., intake manifold) toward an exterior of the wall member 60, a pressure medium inside the wall member 60 is introduced from the opening portion 31a of the port portion 30, and is further introduced to the pressure detection chamber 14 of the case 10 through the pressure introduction passage 31. Therefore, the temperature detecting element 40 detects the temperature of the pressure medium while the pressure medium passes the temperature detecting element 40 in the pressure introduction passage 31.

The pressure detecting element 20 generates an electrical signal having a level corresponding to a detecting pressure value, and the electrical signal is output to an exterior circuit through the lead wire 41 and the terminals 11. Accordingly, the sensor device 100 can detect both the temperature and the pressure of an inner portion of the wall member 60 of a subject device (e.g., intake manifold).

In this embodiment, because the temperature detecting element 40 is arranged in the opening portion 31a through which the pressure inside the wall member 60 of the subject device is introduced, the diameter of the port portion 30 can be made smaller. Therefore, a pressure-receiving area of the tip end of the port portion 30, to which the pressure inside the wall member 60 is applied, can be made smaller, and it can prevent the sensor device 100 from being removed from the wall member 60 of the subject device due to a large-area pressure receiving.

In this embodiment, the bottom portion 43 of the U-shaped bend of the lead wire 41 is fixed using the fixing member 42. Therefore, it can prevent the temperature detecting element 40 from being vibrated due to the pressure medium introduced from the opening portion 31a of the port portion 30.

Furthermore, the temperature detecting element 40 is disposed in the pressure introduction passage 31 to face the opening portion 31a. Therefore, the temperature of the pressure medium introduced from the opening portion 31a can be accurately detected.

The sensor device 100 can be easily attached to the wall member 60 of a subject device manually or mechanically only by pushing the sensor device 100 to the wall member 60 in one step.

In this embodiment, the attachment elastic member 50 is provided with the first end flange portion 51 and the second end flange portion 52 at the two end portions of the attachment elastic member 50 in the axial direction. Therefore, when the sensor device 100 is attached to the wall member 60, the outer wall surface 62 and the inner wall surface 61 of the wall member 60 are press-inserted between the first end flange portion 51 and the second end flange portion 52 of the attachment elastic member 50. Thus, the attachment elastic member 50 can be tightly fixed to the wall member 60, and the sensor device 100 can be accurately fixed to the wall member 60 of the subject device through the attachment elastic member 50. Furthermore, because the taper surface 51c is provided on the outer periphery portion of the first end flange portion 51, the attachment elastic member 50 can be smoothly inserted into the attachment hole 61 of the wall member 60 of the subject device.

Furthermore, the inner diameter of the one end portion (e.g., first end flange portion 51) of the attachment elastic member 50 is made smaller than the outer diameter of the tip end portion of the port portion 30. Accordingly, when the attachment elastic member 50 is temporarily assembled to the tip end portion of the port portion 30, the one end portion of the attachment elastic member 50 is elastically deformed and enlarged by the tip portion of the port portion 30, so as to fasten the tip end portion of the port portion 30. Thus, when the attachment elastic member 50 is temporarily assembled to the tip end portion of the port portion 30, it can prevent the attachment elastic member 50 from being removed from the port portion 30.

Furthermore, because the inner wall protrusion 53a and the outer wall protrusion 53b are provided in the attachment elastic member 50, a clearance between the port portion 30 and the wall surface of the attachment hole 61 of the wall member 60 of the subject device can be accurately sealed by the elastic force of the inner wall protrusion 53a and the outer wall protrusion 53b of the attachment elastic member 50.

Second Exemplary Embodiment

Figure 5:
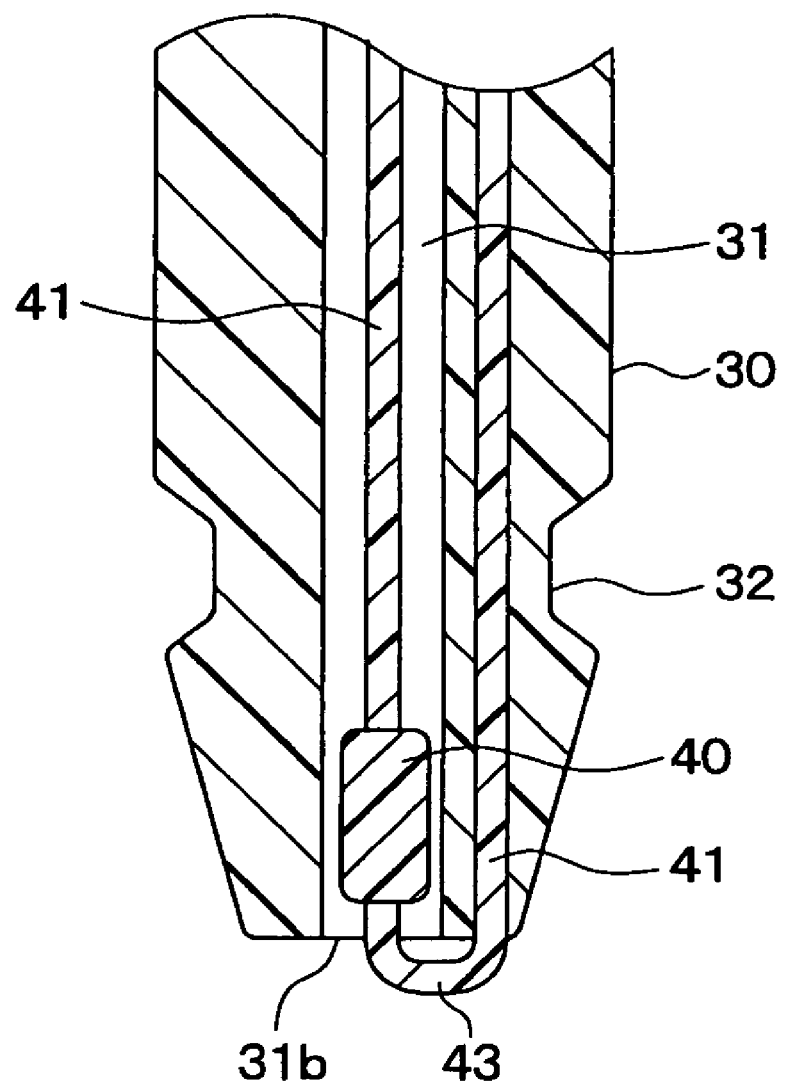
FIG. 5 is a schematic sectional view showing a pressure sensor device with a temperature detecting element according to a second exemplary embodiment of the present invention.
Figure 6A:
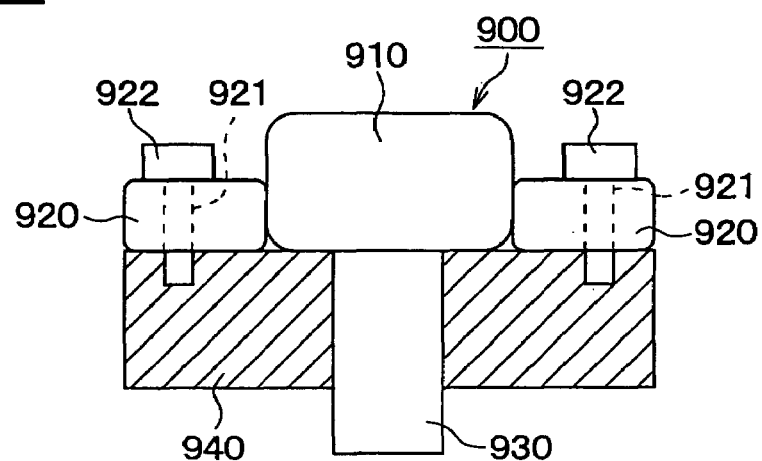
FIG. 6A is a schematic sectional view of a related device showing a sensor device attached to a wall member of a subject device.
Figure 6B:
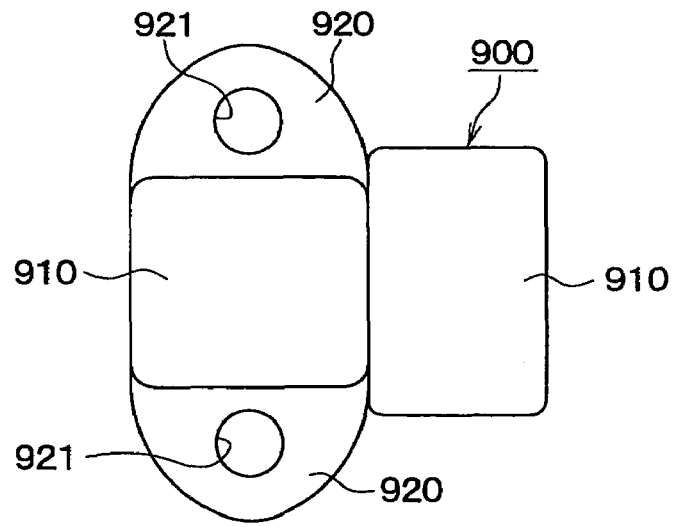
FIG. 6B is a top view showing the sensor device in FIG. 6A.

The second exemplary embodiment will be described with reference to FIG. 5. In the second exemplary embodiment, as shown in FIG. 5, a part of the lead wire 41 arranged in the port portion 30 is insert-molded in the port portion 30. In this case, the diameter of the port portion 30 can be set smaller because it is enough to only consider a receiving space of the temperature detecting element 40 when the radial dimension of the port portion 30 is set. For example, a part of the lead wire 41, extending in the axial direction of the port portion 30, is insert-molded in the port portion 30 to be embedded in the wall portion of the port portion 30.

The lead wire 41 is bent to have a U shape, and a bottom portion 43 of the U-shaped bend of the lead wire 41 protrudes from a tip end of the port portion 30. The temperature detecting element 40 is connected to the lead wire 41, and is arranged in the pressure introduction passage 31 adjacent to the tip end of the port portion 30. Because a part of the lead wire 41 is fixed to the port portion 30 by the insert-molding in the wall portion of the port portion 30, it is unnecessary to form an additional fixing member for fixing the lead wire 41.

In the second exemplary embodiment, an opening portion 31*b* is opened at the tip end of the port portion 30, and a pressure medium inside the wall member 60 of a subject device is introduced to the pressure introduction passage 31 through the opening portion 31*b*. In the second exemplary embodiment, the other structure of the sensor device 100 is similar to that described in the first exemplary embodiment.

Next, a manufacturing method of the sensor device 100 will be described. First, the terminals 11 are insert-molded in the case 10, and the case 10 having therein the pressure detecting element 20 is prepared. Further, the temperature detecting element 40 connected to the lead wire 41 is prepared, and the port portion 30 in which a part of the lead wire 41 is insert-molded is formed.

Next, the port portion 30 is connected to the case 10 through the adhesive material 15. For example, the port portion 30 is bonded to the case 10 through the adhesive material 15 such that the lead wire 41 contacts the terminal 11.

In the second exemplary embodiment, a part of the lead wire 41 is insert-molded in the wall portion of the port portion 30. Therefore, the radial dimension of the port portion 30 can be set smaller, and the temperature detecting element 40 connected to the lead wire 41 can be tightly fixed to the port portion 30 without using an additional fixing member (e.g., a fixing member 42 described in the first exemplary embodiment).

In the second exemplary embodiment, the sensor device 100 can be attached to the wall member 60 through the attachment elastic member 50, similarly to first exemplary embodiment. In this case, because the diameter of the port portion 30 becomes smaller due to the insert-molding of the lead wire 41 in the port portion 30, a force receiving area of the sensor device 100 at the tip end of the port portion 30 can be made smaller. Therefore, it can effectively prevent the sensor device 100 from being removed from the wall member 60.

Other Embodiments

Although the present invention has been described in connection with some exemplary embodiments thereof with reference to the accompanying drawings, it is to be noted that various changes and modifications will become apparent to those skilled in the art.

For example, the material of the attachment elastic member 50 is not limited to that described in the exemplary embodiments. A rubber material having a sufficient elasticity and a strength can be used as the material of the attachment elastic member 50. For example, a silicon rubber, a fluoro rubber, an acrylic rubber, a phloro-silicon rubber or an ethylene-propylene rubber (EPDM) can be used as the material of the attachment elastic member 50. Furthermore, the shape of the attachment elastic member can be suitably changed.

In the above-described exemplary embodiments, the lead wire 41 is formed to have a U-shape. However, the shape of the lead wire may be changed only when the temperature detecting element 40 is connected to the lead wire 41 in the port portion 30.

While the invention has been described with reference to exemplary embodiments thereof, it is to be understood that the invention is not limited to the exemplary embodiments and constructions. The invention is intended to cover various modification and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. A sensor device comprising:
   a pressure detecting element for detecting a pressure;
   a terminal that is electrically connected to the pressure detecting element;
   a case in which the pressure detecting element is received and the terminal is insert-molded;
   a port portion connected to the case, the port portion defining a pressure introduction passage through which a pressure medium is introduced to the pressure detecting element;
   a temperature detecting element disposed in the pressure introduction passage to detect a temperature of the pressure medium;
   a lead wire through which the temperature detecting element is electrically connected to the terminal; and
   a fixing member disposed at a tip end portion of the port portion to fix the lead wire at the tip end portion of the port portion, wherein:
   the port portion has an opening portion from which the pressure medium is introduced to the pressure introduction passage, the opening portion penetrating through a side wall of the port portion at a position proximate to the tip end portion of the port portion; and
   the temperature detecting element is disposed such that the pressure medium introduced from the opening portion passes the temperature detecting element and is conducted to the pressure detecting element through the pressure introduction passage.

2. The sensor device according to claim 1, wherein:
   the lead wire has a U-shaped bend; and
   a bottom portion of the U-shaped bend of the lead wire is fixed by the fixing member at the tip end portion of the port portion.

3. The sensor device according to claim 2, wherein the fixing member is disposed to surround the bottom portion of the U-shaped bend of the lead wire.

4. The sensor device according to claim 1, wherein the temperature detecting element faces the opening portion.

5. The sensor device according to claim 1, wherein:
   the port portion has a recess portion recessed from an outer wall surface to a radial inward, and a tapered portion tapered toward a tip end of the port portion; and
   the tapered portion is arranged adjacent to the recess portion in an axial direction of the port portion, and is positioned between the recess portion and the tip end portion of the port portion in the axial direction.

6. The sensor device according to claim 5, wherein the opening portion is offset toward the tip end of the port portion from a center of the recess portion in the axial direction of the port portion.

7. The sensor device according to claim 5, further comprising
   an attachment elastic member through which the port portion is attached to an attachment hole of a wall member of a subject device, wherein:
   the attachment elastic member includes a first end flange portion having a protrusion protruding radially inside in the recess portion to contact an inner wall surface of the wall member of the subject device, a second end flange portion arranged between a side surface of the port portion and an outer wall surface of the wall member of the subject device, and a wall portion that extends between the first end flange portion and the second end flange portion in the axial direction; and the wall portion of the attachment elastic member is inserted between an outer peripheral surface of the port portion and a wall surface of the wall member of the subject device in which the attachment hole is formed.

8. The sensor device according to claim 7, wherein an inner diameter of the protrusion of the first end flange portion is smaller than an outer diameter of the tip end of the port portion.

9. The sensor device according to claim 1, wherein a part of the lead wire is insert-molded in a wall portion of the port portion.

10. A sensor device comprising:
a pressure detecting element for detecting a pressure;
a terminal that is electrically connected to the pressure detecting element;
a case in which the pressure detecting element is received and the terminal is insert-molded;
a port portion connected to the case, the port portion defining a pressure introduction passage through which a pressure medium is introduced to the pressure detecting element;
a temperature detecting element disposed in the pressure introduction passage to detect a temperature of the pressure medium; and
a lead wire through which the temperature detecting element is electrically connected to the terminal, wherein:
the port portion has an opening portion opened at a tip end of the port portion, from which the pressure medium is introduced to the pressure introduction passage;
a part of the lead wire is insert-molded in a wall portion of the port portion; and
the temperature detecting element is disposed such that the pressure medium introduced from the opening portion passes the temperature detecting element and is conducted to the pressure detecting element through the pressure introduction passage.

11. The sensor device according to claim 10, wherein: the lead wire has a U-shaped bend.

12. The sensor device according to claim 11, wherein a bottom portion of the U-shaped bend protrudes from the tip end of the port portion.

13. The sensor device according to claim 10, wherein the temperature detecting element is disposed in the pressure introduction passage proximate to the tip end of the port portion.

14. The sensor device according to claim 10, wherein:
port portion has a recess portion recessed from an outer wall surface, and a tapered portion tapered toward the tip end of the port portion; and
the tapered portion is arranged adjacent to the recess portion in an axial direction of the port portion, and is positioned between the recess portion and the tip end of the port portion in the axial direction.

15. The sensor device according to claim 10, further comprising
an attachment elastic member through which the port portion is attached to an attachment hole of a wall member of a subject device, wherein:
the attachment elastic member includes a first end flange portion having a protrusion protruding radially inside in the recess portion, a second end flange portion arranged between a side surface of the port portion and an outer wall surface of the wall member of the subject device, and a wall portion between the first end flange portion and the second end flange portion in the axial direction; and the wall portion of the attachment elastic member is inserted between an outer peripheral surface of the port portion and a wall surface of the wall member of the subject device in which the attachment hole is formed.

16. A method for attaching a sensor device to a wall member of a subject device, the sensor device including a pressure detecting element for detecting a pressure of a pressure medium introduced from an interior of the wall member of the subject device through a pressure introduction passage of a port portion, and a temperature detecting element disposed in the pressure introduction passage of the port portion of the sensor device to detect a temperature of the pressure medium introduced from an opening portion of the port portion, the method comprising
preparing an attachment elastic member that is formed to have a hollow shape and includes a first end flange portion having an end protrusion protruding radially inward at one axial end of the attachment elastic member, a second flange portion provided at the other axial end of the attachment elastic member, and an inner protrusion portion provided between the first end flange portion and the second end flange portion to protrude radially inside;
temporarily attaching the attachment elastic member to the sensor device, wherein the temporarily attaching includes inserting a tip portion of the port portion from the second end flange portion of the attachment elastic member into the attachment elastic member such that a tip end surface of the port portion contacts the end protrusion and the inner protrusion portion is received in a recess portion of the port portion;
moving the tip end portion of the port portion to an upper portion of an attachment hole of the wall member in a state where the attachment elastic member is temporarily assembled to the port portion; and
pushing the sensor device toward the attachment hole of the wall member so that the port portion is inserted into the attachment hole until the end protrusion of the first flange portion is received in the recess portion of the port portion,
wherein the port portion is fixed to the attachment hole through the attachment elastic member after the pushing.

17. The attachment method according to claim 16, wherein the preparing of the attachment elastic member includes forming a tapered surface on an outer wall surface of the first end flange portion.

18. The attachment method according to claim 16, wherein:
the port portion has a tapered end portion tapered toward a tip end of the port portion; and
in the preparing, an inner diameter of the end protrusion of the first end flange portion of the attachment elastic member is made smaller than an outer diameter of the tip portion of the port portion.

19. The attachment method according to claim 16, wherein the preparing includes forming an outer protrusion on an outer wall surface of the attachment elastic member.

20. The attachment method according to claim 16, wherein the pushing is performed in one step.

* * * * *